United States Patent
Rehman

(10) Patent No.: US 6,177,498 B1
(45) Date of Patent: Jan. 23, 2001

(54) INK-JET INK COMPOSITIONS COMPRISING A LATEX POLYMER AND DIOL ADDITIVES

(75) Inventor: Zia Rehman, Corvallis, OR (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/253,226

(22) Filed: Feb. 19, 1999

(51) Int. Cl.⁷ .............................. C09D 11/10; C08K 5/053
(52) U.S. Cl. ...................... 524/388; 524/386; 106/31.85; 106/31.86
(58) Field of Search ................... 524/388, 386; 106/31.13, 31.6, 31.85, 31.86

(56) References Cited

U.S. PATENT DOCUMENTS

| | | | |
|---|---|---|---|
| 4,454,260 | 6/1984 | Dawans et al. | 523/130 |
| 4,532,276 | 7/1985 | Knable | 524/18 |
| 5,085,698 | 2/1992 | Ma et al. | 106/20 |
| 5,098,476 | 3/1992 | Baker | 106/22 |
| 5,181,045 | 1/1993 | Shields et al. | 346/1.1 |
| 5,364,461 | 11/1994 | Beach et al. | 106/22 R |
| 5,529,616 | 6/1996 | Prasad et al. | 106/20 R |
| 5,554,739 | 9/1996 | Belmont | 534/885 |
| 5,571,311 | 11/1996 | Belmont et al. | 106/20 R |
| 5,580,372 | 12/1996 | Gino et al. | 106/20 R |
| 5,589,522 | 12/1996 | Beach et al. | 523/160 |
| 5,624,485 | 4/1997 | Galhoun | 524/386 |
| 5,630,868 | 5/1997 | Belmont et al. | 106/31.75 |
| 5,688,311 | 11/1997 | Adamic | 106/20 R |
| 5,700,851 | 12/1997 | Banning et al. | 523/161 |
| 5,707,432 | 1/1998 | Adams et al. | 106/31.6 |
| 5,719,204 | 2/1998 | Beach et al. | 523/161 |
| 5,772,742 | 6/1998 | Wang | 106/31.27 |
| 5,785,743 | 7/1998 | Adamic et al. | 106/31.27 |

FOREIGN PATENT DOCUMENTS

| | | |
|---|---|---|
| 89-288624/40 | 2/1988 | (JP) . |
| WO 94/29393 | 12/1994 | (WO) . |

*Primary Examiner*—David W. Wu
*Assistant Examiner*—Kelechi C. Egwim

(57) ABSTRACT

A solvent system has been found which aids in start-up, drop ejection, decap and high frequency firing above 10 kHz for inks which contain latex polymers. Two solvents work in conjunction with each other: 3-hexyne-2,5-diol and 1,2-octanediol. These two solvents in combination improve printability in latex polymer-containing ink-jet inks. Such ink-jet inks also include one or more pigments and a vehicle comprising at least one organic, water-miscible solvent and water.

16 Claims, No Drawings

INK-JET INK COMPOSITIONS COMPRISING A LATEX POLYMER AND DIOL ADDITIVES

TECHNICAL FIELD

The present invention relates generally to ink-jet inks, and, more particularly to ink-jet inks containing latex polymers having improved print properties.

BACKGROUND ART

Ink-jet inks have recently been developed that utilize latex polymers to achieve smearfastness. Examples of such latex polymers are disclosed in, for example, application Ser. No. 09/120,046, filed Jul. 21, 1998. Examples of such latex polymers used in formulating ink-jet ink compositions are disclosed in, for example, Ser. No. 09/120,270, also filed Jul. 21, 1998. Both applications are assigned to the same assignee as the present application.

There are two types of such latex polymers disclosed and claimed. The first type is referred to as durable core/shell polymers and are given by the formula

  (I)

wherein A, B, C, D, and E represent functionalities as follows:

- A=at least one hydrophobic component contributing to improved durable, film-forming properties selected from moieties which, when homo-polymerized to a solid state, have a glass transition temperature ($T_g$) in the range between −150° C. to +25° C.;
- B=at least one hydrophobic and solvent barrier moiety used to adjust the $T_g$ of the hydrophobic component of the polymer (I) which, when homo-polymerized to a solid state, has a $T_g$ greater than +25° C.;
- C=at least one hydrophilic component, selected from a wide variety of water-soluble monomers (optional);
- D=at least one UV absorber (optional);
- E=a moiety having at least one highly polar functional group (optional);
- m=5 to 95 wt %;
- n=5 to 95 wt %;
- p=0 to 60 wt %;
- q=0 to 50 wt %;
- r=0 to 40 wt %;
- m+n+p+q+r=100 wt %; and
- x=1 to 100,000.

Preferably, the final $T_g$ of the polymer(s) (I) is within the range of about −25° to +110° C., and more preferably, the final $T_g$ is within the range of about −15° to +90° C., and most preferably within the range of about −10° to +75° C.

The molecular weight (weight average) of polymer (I) is between about 1,000 and 2,000,000, preferably between about 5,000 and 500,000, and most preferably between about 10,000 and 70,000.

Either the C moiety or the E moiety must be present in the polymer to provide a polymer having either a hydrophilic portion or a highly polar portion. Alternatively, one or more surfactants may be used in conjunction with polymer (I), whether in the presence or the absence of the C or E, or both, moieties. The surfactant(s) may be anionic, cationic, non-ionic, or zwitterionic.

The second type of latex polymers is referred to as primer core/shell polymers, which also have a hydrophilic portion and a hydrophobic portion and have the following general structure given by formula (II)

  (II)

wherein A, B, C, and E are as described above and where m, n, and r are as follows:

- m=0 to 90 wt %, preferably 10 to 60 wt %, and more preferably 15 to 50 wt %;
- n=0 to 90 wt %, preferably 10 to 60 wt %, and more preferably 15 to 50 wt %;
- p=0 to 90 wt %, preferably 10 to 60 wt %, and more preferably 15 to 50 wt %;
- r=0.01 to 100 wt %, preferably 0.01 to 60 wt %, and more preferably 1 to 40 wt %;
- m+n+r=100 wt %; and
- y=1 to 100,000, preferably 10 to 10,000, and more preferably 100 to 1,000.

Preferably, either m or n is non-zero.

The $T_g$ of the primer core/shell polymers is within the range of about −100° to +100° C., preferably within the range of about −25° to +25° C., and more preferably within the range of about 0° to +25° C.

The molecular weight (weight average) of polymer (II) is between about 100 and 2,000,000, preferably between about 1,000 and 500,000, and most preferably between about 5,000 and 300,000.

These latex polymers, though good for smearfastness, are difficult to print. The printability concerns stems from one or more of the following factors. Because of their partial solubility, these polymers could hinder the bubble nucleation, growth, and ejection process and also could dry fast in the orifice. Essentially, because of their bulky nature, they collect at the interface during nucleation and firing of the droplet, thus hindering the firing. By "printability" is meant any or all of the foregoing: start-up, drop ejection, decap and high frequency firing above 10 kHz. By "start-up" is meant when the pen first starts to fire, the ease with which it fires all nozzles, i.e., the amount of "spitting" required before all nozzles are active. By "drop ejection" is meant the degree of straight drops whose characteristics do not change with (1) time, (2) amount of firing, and (3) frequency. By "decap" is meant the ability of the pen to fire all nozzles consistently after non-firing periods of 5, 10, 15, or up to 20 seconds.

There is a need to improve the printability of ink-jet inks that utilize latex polymers, whether of the foregoing formulations or of other formulations.

DISCLOSURE OF INVENTION

In accordance with the present invention, a solvent system has been found which aids in start-up, drop ejection, decap and high frequency firing above 10 kHz for inks which contain latex polymers. Two solvents work in conjunction with each other: 3-hexyne-2,5-diol and 1,2-octanediol. These two solvents in combination improve printability in latex polymer-containing ink-jet inks.

BEST MODES FOR CARRYING OUT THE INVENTION

Latex polymers, also termed "core/shell" polymers, are polymers having both hydrophilic and hydrophobic portions. Such polymers are primarily used in pigment-based inks to improve the smearfastness of the inks.

In accordance with the present invention, the printability of inks containing one or more latex polymers is improved by including in the vehicle of the ink the following two co-solvents: 3-hexyne-2,5-diol and 1,2-octanediol. These two solvents in combination improve the printability of latex polymer-containing ink-jet inks.

The first compound (3-hexyne-2,5-diol) is present in a range of about 1 to 8 wt %, while the second compound (1,2-octanediol) is present in a range of about 0.01 to 0.5 wt %, both of the total ink composition. Preferably, the second compound is employed at the lower range of concentration, due to its tendency to feather at higher concentrations.

Although the concentration of each compound may be independent of the other, it is preferred that the ratio of the first compound to the second compound be about 100:1 to 1:100, and preferably about 20:1.

The inks of the invention comprise a colorant and a vehicle. Specifically, the inks of the present invention comprise about 5 to 50 wt %, preferably about 10 to 25 wt %, water-miscible organic co-solvent, about 0.05 to 10 wt %, preferably about 0.5 to 10 wt %, colorant, about 0.005 to 50 wt %, preferably about 0.1 to 10 wt %, more preferably about 0.5 to 5 wt %, durable core/shell polymer, about 0.005 to 50 wt %, preferably about 0.1 to 10 wt %, more preferably about 0.5 to 5 wt %, primer core/shell polymer, and water. Other components and additives to the ink may also be present, as discussed below.

The black inks of the invention comprise a pigment and a vehicle. Specifically, 15 the black inks of the present invention comprise about 5 to 50 wt %, preferably about 10 to 25 wt %, water-miscible organic co-solvent, about 0.05 to 10 wt %, preferably about 0.5 to 10 wt %, pigment, about 0.005 to 50 wt %, preferably about 0.1 to 10 wt %, more preferably about 0.5 to 5 wt %, durable latex polymer, about 0.005 to 50 wt %, preferably about 0.1 to 10 wt %, more preferably about 0.5 to 5 wt %, primer latex polymer, and water, in addition to the ester or diol/triol additive discussed above. Other components and additives to the ink may also be present, as discussed below.

1. Self-Dispersed Pigments

In one embodiment, the colorant employed in the ink is a self-dispersing pigment. Such pigments suitable for use in the practice of the present invention include all chemically-modified, water-dispersible pigments known for use in ink-jet printing. These chemical modifications impart water-dispersibility to the pigment precursors that encompass all organic pigments.

For self-dispersibility or water solubility, the pigments herein are modified by the addition of one or more organic groups comprising at least one aromatic group or a $C_1$–$C_{12}$ alkyl group and at least one ionic or ionizable group. The ionizable group is one that forms its ionic groups in the aqueous medium. The ionic group may be anionic or cationic. The aromatic groups may be further substituted or unsubstituted. Examples include phenyl or naphthyl groups and the ionic group is sulfonic acid, sulfinic acid, phosphonic acid, carboxylic acid, ammonium, quaternary ammonium, or phosphonium group.

Depending on the process selected, the pigment can either be anionic or cationic in character. As commercially available, the anionic chromophores are usually associated with sodium or potassium cations, and the cationic chromophores are usually associated with chloride or sulfate anions.

For modification, one preferred method is treatment of a carbon black pigment with aryl diazonium salts containing at least one acidic functional group. Examples of aryl diazonium salts include those prepared from sulfinic acid, 4-aminobenzoic acid, 4-aminosalicylic acid, 7-amino-4-hydroxy-2-naphthylenesulfonic acid, aminophenylboronic acid, aminophenylphosphonic acid, and metalinic acid.

Ammonium, quaternary ammonium groups, quaternary phosphonium groups, and protonated amine groups represent examples of cationic groups that can be attached to the same organic groups discussed above.

Reference is made to U.S. Pat. Nos. 5,707,432; 5,630,868; 5,571,311; and 5,554,739 for a discussion of modified carbon black pigments and methods of attaching the functionalized groups.

The following water-insoluble pigments are useful in the practice of the invention; however, this listing is not intended to limit the invention. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Igralite® Rubine 4BL. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigment is available from Hoechst: Permanent Rubine F6B. The following pigment is available from Sun Chemical: LHD9303 Black.

Self-dispersing pigments are also commercially available from Cabot as Cab-O-Jet® and Cab-O-Jet® 300.

In another embodiment herein, the black pigment is dispersed in the ink composition with the aid of a dispersing agent. Such black pigments include any black pigment that is dispersed with a dispersant having an anionic functionality, for example, the Joncryl polymers available from S.C. Johnson Polymer. Of course, any other dispersant exhibiting anionic charges may be employed in the practice of the present invention. For a more complete discussion of black pigments and anionic dispersants, see U.S. Pat. Nos. 5,181,045 and 5,785,743.

2. Latex Polymers

Ink-jet inks have recently been developed that utilize latex polymers to achieve smearfastness. Examples of such latex polymers are disclosed in, for example, application Ser. No. 09/120,270 and application Ser. No. 09/120,046, both filed Jul. 21, 1998.

There are two types of such latex polymers employed in the practice of the present invention. The first type is referred to as "durable core/shell" polymers and are given by the formula

  (I)

wherein A, B, C, D, and E represent functionalities as follows:

A=at least one hydrophobic component contributing to improved durable, film-forming properties selected from moieties which, when homo-polymerized to a solid state, have a glass transition temperature ($T_g$) in the range between −150° C. to +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=5 to 95 wt %;

n=5 to 95 wt %;

p=0 to 60 wt %;

q=0 to 50 wt %;

r=0 to 40 wt %;

m+n+p+q+r=100 wt %; and x=1 to 100,000.

Preferably, the final $T_g$ of the polymer(s) (I) is within the range of about −25° to +110° C., and more preferably, the final $T_g$ is within the range of about −15° to +90° C., and most preferably within the range of about −10° to +75° C.

The molecular weight (weight average) of polymer (I) is between about 1,000 and 2,000,000, preferably between about 5,000 and 500,000, and most preferably between about 10,000 and 70,000.

Either the C moiety or the E moiety must be present in the polymer to provide a polymer having either a hydrophilic portion or a highly polar portion. Alternatively, one or more surfactants may be used in conjunction with polymer (I), whether in the presence or the absence of the C or E, or both, moieties. The surfactant(s) may be anionic, cationic, non-ionic, or zwitterionic.

The second type of latex polymers is referred to as "primer core/shell" polymers, which also have a hydrophilic portion and a hydrophobic portion and have the following general structure given by formula (II)

$$[(A)_m(B)_n(C)_p(E)_r]_y \quad (II)$$

wherein A, B, C, and E are as described above and where m, n, and r are as follows:

m=0 to 90 wt %, preferably 10 to 60 wt %, and more preferably 15 to 50 wt %;

n=0 to 90 wt %, preferably 10 to 60 wt %, and more preferably 15 to 50 wt %;

p=0 to 90 wt %, preferably 10 to 60 wt %, and more preferably 15 to 50 wt %;

r=0.01 to 100 wt %, preferably 0.01 to 60 wt %, and more preferably 1 to 40 wt %;

m+n+r=100 wt %; and y=1 to 100,000, preferably 10 to 10,000, and more preferably 100 to 1,000.

Preferably, either m or n is non-zero.

The $T_g$ of the primer core/shell polymers is within the range of about −100° to +100° C., preferably within the range of about −25° to +25° C., and more preferably within the range of about 0° to +25° C.

The molecular weight (weight average) of polymer (II) is between about 100 and 2,000,000, preferably between about 1,000 and 500,000, and most preferably between about 5,000 and 300,000.

The durable and primer core/shell polymers are used with pigment colorants to disperse them in aqueous-based inks.

3. Vehicle

The vehicle comprises one or more co-solvents and water. The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol)ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3,5-(2-methyl)-pentanetriol, tetramethylene sulfone, 3-methoxy-3-methylbutanol, glycerol, and 1,2-alkyldiols.

The balance of the ink is water, together with other additives commonly added to ink-jet inks, which are employed to optimize the properties of the ink for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired. The purity of all components is that normally employed in conventional commercial practice of formulating ink-jet inks.

The pH of the pigment-based dye may be adjusted to a slightly basic value, say about 8.5, with potassium hydroxide, sodium hydroxide, sodium carbonate, or triethanol amine.

EXAMPLES

Example 1

A black ink was formulated with the following components:

| | |
|---|---|
| 6 wt % | 2-pyrrolidone |
| 7 wt % | 3-hexyne-2,5-diol |
| 0.3 wt % | 1,2-octanediol |
| 0.5 wt % | hexylene glycol |
| 3.80 wt % | LEG-1 (liponic ethylene glycol, available from Liponics)- |
| 3 wt % | durable latex polymer QX25A, comprising (hexyl acrylate)$_{40}$ (methyl methacrylate)$_{40}$ (methyl polyethylene glycol (mw = 2000) methacrylate)$_{20}$ |
| 1 wt % | primer latex polymer QX26B, comprising (methyl methacrylate)$_{32}$ (hexyl acrylate)$_{46}$ (methyl polyethylene glycol (mw = 350) methacrylate)$_{12}$ (acrylic acid)$_{10}$ |
| 3 wt % | Cabot Monarch 700 pigment, treated with p-aminobenzoic acid (PABA) and amino dodecanoic acid (ADDA) (ratio: 0.8:0.5) |
| balance | water. |

The pH was adjusted to 8.5 with potassium hydroxide.

Comparative Example 1

The black ink of Example 1 was formulated, except that the 3-hexyne-2,5-diol and the 1,2-octanediol were omitted.

Results Between Example 1 and Comparative Example 1

Both black inks were printed on plain paper. Tests for printability (start up, drop ejection, and decap) were then conducted. High frequency firing above 10 kHz is part of the drop ejection test.

The objective of the start-up test is to determine how an ink behaves when filled in the pens and first for the first time. The test procedure involves printing a diagnostic file for a number of pages and then counting the number of nozzles present after each page. The larger the number of nozzles present at each page, the better the ink on start-up.

The objective of the drop ejection test is to determine the steadiness of a drop (1) at different frequencies and (2) at the same frequency at different times. The test procedure involves the use of various proprietary tools to determine drop ejection.

The objective of the decap test is to determine how the pen performs after slewing on the carriage without firing. The test measures the propensity of the ink to dry in the nozzles while the pen is not firing during slewing. The test procedure involves printing a diagnostic file, which fires at intervals of 5, 10, 15, and 20 seconds. The number of nozzles present at each time interval are counted. The greater the time interval and the greater the number of nozzles present, the better the ink. Two diagnostics are usually run; the first diagnostic is the first time all nozzles fire, and the second diagnostic is the second time all nozzles fire.

The inks of Example 1 were observed to evidence excellent printability as compared to the inks of Comparative Example 1. A frequency scan showed that both inks printed at high frequency without nozzle degradation. The inks of Example 1 evidenced good short-term decap. Specifically, the short-term decap for the inks of Example 1 was 15 to 20 seconds (all diagnostics recovered), while the short-term decap for the inks of Comparative Example 1 was 5 seconds (the second diagnostic did not recover). The long-term decap of the inks of Example 1 recovered after lying for 1 day without tape (i.e., exposed to air) and required no intervention, while the long-term decap of the inks of Comparative Example 1 did not recover.

INDUSTRIAL APPLICABILITY

The two co-solvents, 3-hexyne-2,5-diol and 1,2-octanediol, are expected to find use in ink-jet inks containing latex polymers for improving their printability.

Thus, there have been disclosed ink-jet ink compositions to which two specific co-solvents have been added for improved printability where those ink-jet ink compositions contain one or more latex polymers. It will be apparent to those skilled in this art that various changes and modifications of an obvious nature may be made, and all such changes and modifications are considered to fall within the scope of the appended claims.

What is claimed is:

1. An ink-jet ink for ink-jet printing, said ink-jet ink containing at least one latex polymer, characterized in that said ink-jet ink further contains 3-hexyne-2,5-diol in a range of about 1 to 8 wt % and 1,2-octanediol in a range of about 0.01 to 0.5%, both wt % based on the total weight of the ink, whereby said ink-jet ink evidences improved printability over an ink without said two diols.

2. The ink-jet ink of claim 1 additionally containing at least one colorant and a vehicle.

3. The ink-jet ink of claim 2 wherein said at least one colorant comprises at least one pigment.

4. The ink-jet ink of claim 2 wherein said vehicle comprises at least one organic, water-miscible solvent and water.

5. The ink-jet ink of claim 4 additionally comprising at least one additive for modifying one or more properties of said ink.

6. The ink-jet ink of claim 1 wherein said at least one latex polymer comprises at least one latex polymer selected from the group consisting of:

(a)

   (I)

wherein A, B, C, D, and E represent functionalities as follows:
- A=at least one hydrophobic component contributing to improved durable, film-forming properties selected from moieties which, when homo-polymerized to a solid state, have a glass transition temperature ($T_g$) in the range between −150° C. to +25° C.;
- B=at least one hydrophobic and solvent barrier moiety used to adjust the $T_g$ of the hydrophobic component of the polymer (I) which, when homo-polymerized to a solid state, has a $T_g$ greater than +25° C.;
- C=a hydrophilic component, selected from water-soluble monomers;
- D=at a UV absorber;
- E=a moiety having at least one highly polar functional group;
- m=5 to 95 wt %;
- n=5 to 95 wt %;
- p=0 to 60 wt %;
- q=0 to 50 wt %;
- r=0 to 40 wt %;
- m+n+p+q+r=100 wt %; and
- x=1 to 100,000; and (b)

   (II)

wherein A, B, C, and E are as described above and where m, n, p, and r of formula (II) are as follows:
- m=0 to 90 wt %;
- n=0 to 90 wt %;
- p=0 to 90 wt %;
- r=0.01 to 100 wt %;
- m+n+p+r=100 wt %; and
- y=1 to 100,000.

7. An ink-jet ink for ink-jet printing, said ink-jet ink comprising at least one pigment, a vehicle comprising at least one organic, water-miscible solvent and water, at least one additive for modifying one or more properties of said ink, and at least one latex polymer, characterized in that said ink-jet ink further contains 3-hexyne-2,5-diol in a range of about 1 to 8 wt % and 1,2-octanediol in a range of about 0.01 to 0.5%, both wt % based on the total weight of the ink whereby said ink-jet ink evidences improved printability over an ink without said two diols.

8. The ink-jet ink of claim 7 wherein said at least one latex polymer comprises at least one latex polymer selected from the group consisting of:

(a)

   (I)

wherein A, B, C, D, and E represent functionalities as follows:
- A=at least one hydrophobic component contributing to improved durable, film-forming properties selected from moieties which, when homo-polymerized to a solid state, have a glass transition temperature ($T_g$) in the range between −150° C. to +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=a hydrophilic component, selected from water-soluble monomers,

D=a UV absorber;

E=a moiety having at least one highly polar functional group, m=5 to 95 wt %;
n=5 to 95 wt %;
p=0 to 60 wt %;
q=0 to 50 wt %;
r=0 to 40 wt %;
m+n+p+q+r=100 wt %; and
x=1 to 100,000; and (b)

$$[(A)_m(B)_n(C)_p(E)_r]_y \quad (II)$$

wherein A, B, C, and E are as described above and where m, n, p, and r of formula (II) are as follows:

m=0 to 90 wt %;
n=0 to 90 wt %;
p=0 to 90 wt %;
r=0.01 to 100 wt %;
m+n+p+r=100 wt %; and
y=1 to 100,000.

9. A method for improving printability of an ink-jet ink for ink-jet printing, said ink-jet ink containing at least one latex polymer, said method comprising adding to said ink 3-hexyne-2,5-diol in a range of about 1 to 8 wt % and 1,2-octanediol in a range of about 0.01 to 0.5%, both wt % based on the total weight of the ink.

10. The method of claim 9 wherein said ink additionally contains at least one colorant and a vehicle.

11. The method of claim 10 wherein said at least one colorant comprises at least one pigment.

12. The method of claim 10 wherein said vehicle comprises at least one organic, water-miscible solvent and water.

13. The method of claim 12 wherein said ink additionally comprises at least one additive for modifying one or more properties of said ink.

14. The method of claim 9 wherein said at least one latex polymer comprises at least one latex polymer selected from the group consisting of:

(a)

$$[(A)_m(B)_n(C)_p(D)_q(E)_r]_x \quad (I)$$

wherein A, B, C, D, and E represent functionalities as follows:

A=at least one hydrophobic component contributing to improved durable, film-forming properties selected from moieties which, when homo-polymerized to a solid state, have a glass transition temperature ($T_g$) in the range between −150° C. to +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=a hydrophilic component, selected from water-soluble monomers;

D=a UV absorber;

E=a moiety having at least one highly polar functional group;

m=5 to 95 wt %;
n=5 to 95 wt %;
p=0 to 60 wt %;
q=0 to 50 wt %;
r=0 to 40 wt %;
m+n+p+q+r=100 wt %; and
x=1 to 100,000; and (b)

$$[(A)_m(B)_n(C)_p(E)_r]_y \quad (II)$$

wherein A, B, C, and E are as described above and where m, n, p, and r of formula (II) are as follows:

m=0 to 90 wt %;
n=0 to 90 wt %;
p=0 to 90 wt %;
r=0.01 to 100 wt %;
m+n+p+r=100 wt %; and
y=1 to 100,000.

15. A method for improving printability of an ink-jet ink for ink-jet printing, said ink-jet ink comprising at least one pigment, a vehicle comprising at least one organic, water-miscible solvent and water, at least one additive for modifying one or more properties of said ink, and at least one latex polymer, said method comprising adding to said ink 3-hexyne-2,5-diol in a range of about 1 to 8 wt % and 1,2-octanediol in a range of about 0.01 to 0.5 %, both wt % based on the total weight of the ink.

16. The ink-jet ink of claim 15 wherein said at least one latex polymer comprises at least one latex polymer selected from the group consisting of:

(a)

$$[(A)_m(B)_n(C)_p(D)_q(E)_r]_x \quad (I)$$

wherein A, B, C, D, and E represent functionalities as follows:

A=at least one hydrophobic component contributing to improved durable, film-forming properties selected from moieties which, when homo-polymerized to a solid state, have a glass transition temperature ($T_g$) in the range between −150° C. to +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=a hydrophilic component, selected from water-soluble monomers;

D=a UV absorber

E=a moiety having at least one highly polar functional group;

m=5 to 95 wt %;
n=5 to 95 wt %;
p=0 to 60 wt %;
q=0 to 50 wt %;
r=0 to 40 wt %;

m+n+p+q+r=100 wt %; and
x=1 to 100,000; and (b)

$$[(A)_m(B)_n(C)_p(E)_r]_y \qquad (II)$$

wherein A, B, C, and E are as described above and where m, n, p, and r of formula (II) are as follows:

m=0 to 90 wt %;
n=0 to 90 wt %;
p=0 to 90 wt %;
r=0.01 to 100 wt %;
m+n+p+r=100 wt %; and
y=1 to 100,000.

* * * * *

UNITED STATES PATENT AND TRADEMARK OFFICE
CERTIFICATE OF CORRECTION

PATENT NO.    : 6,177,498 B1                                              Page 1 of 1
DATED         : January 23, 2001
INVENTOR(S)   : Zia Rehman It is certified that error appears in the above-identified patent and that said Letters Patent is hereby corrected as shown below:

Title page,
Item [56], References Cited, the following references should be included:

-- U.S. PATENT DOCUMENTS, 6,057,384 5/2000 Nguyen et al. 523/160; 5,534,050 Jul.1996 Gunderlach 106/20R; 5,709,737 Malhotra et al. 106/31.43;

FOREIGN PATENT DOCUMENTS, 03006270 1/1999 (JP) C09/D11/00; EP0859037A1 Aug 19, 1998 C09D/11/00; EP0872344A2 Oct 21, 1998 B41J/2/01 --

Signed and Sealed this

Twenty-second Day of July, 2003

JAMES E. ROGAN
*Director of the United States Patent and Trademark Office*